(12) United States Patent
Masuda (10) Patent No.: US 10,931,154 B2
(45) Date of Patent: Feb. 23, 2021

(54) AXIAL-GAP TYPE MOTOR

(71) Applicant: NTN CORPORATION, Osaka (JP)

(72) Inventor: Yui Masuda, Iwata (JP)

(73) Assignee: NTN CORPORATION, Osaka (JP)

(*) Notice: Subject to any disclaimer, the term of this patent is extended or adjusted under 35 U.S.C. 154(b) by 141 days.

(21) Appl. No.: 16/373,085

(22) Filed: Apr. 2, 2019

(65) Prior Publication Data

US 2019/0229565 A1    Jul. 25, 2019

Related U.S. Application Data

(63) Continuation of application No. PCT/JP2017/035774, filed on Oct. 2, 2017.

(30) Foreign Application Priority Data

Oct. 5, 2016    (JP) .............................. JP2016-197030

(51) Int. Cl.
*H02K 21/12*    (2006.01)
*H02K 1/14*    (2006.01)
(Continued)

(52) U.S. Cl.
CPC .............. *H02K 1/148* (2013.01); *H02K 1/18* (2013.01); *H02K 21/24* (2013.01); *F16D 65/18* (2013.01); *F16D 2121/24* (2013.01)

(58) Field of Classification Search
CPC ...... H02K 1/148; H02K 2201/09; H02K 1/14; H02K 1/18; H02K 1/2793; H02K 1/146;
(Continued)

(56) References Cited

U.S. PATENT DOCUMENTS 6,809,453 B2 * 10/2004 Narita .................... H02K 17/02
                                                        310/216.008
2006/0028093 A1    2/2006 Minagawa et al.
(Continued)

FOREIGN PATENT DOCUMENTS

CN         1734894 A       2/2005
CN       104377900 A       2/2015
(Continued)

OTHER PUBLICATIONS

English Translation by WIPO of the International Preliminary Report on Patentability dated Apr. 18, 2019 in corresponding International Patent Application No. PCT/JP2017/035774 (9 pages).
(Continued)

*Primary Examiner* — Thanh Lam (57) ABSTRACT

Provided is an axial-gap type motor in which positioning among components composing a yoke-provided core is easy so that manufacturing thereof can be performed accurately and easily, and which exhibits superiority in performance and cost. In the axial-gap type motor, either one of a stator and a rotor includes: a yoke-provided core including an annular back yoke and a plurality of magnetic pole cores projecting from a side surface of the back yoke; and coils. The yoke-provided core is a core-pieces-arrayed body obtained by arraying, in a circumferential direction thereof, core pieces obtained through division for the respective magnetic pole cores. Each core piece includes a magnetic pole core portion and a back yoke portion. Each core piece is a steel plate laminate obtained by stacking a plurality of steel plates in a radial direction.

8 Claims, 6 Drawing Sheets

(51) Int. Cl.
  *H02K 21/24* (2006.01)
  *H02K 1/18* (2006.01)
  *F16D 121/24* (2012.01)
  *F16D 65/18* (2006.01)

(58) Field of Classification Search
  CPC .......... H02K 1/182; H02K 1/27; H02K 3/522; H02K 7/1025
  USPC ................. 310/156.32, 268, 216.062, 89
  See application file for complete search history.

(56) References Cited

U.S. PATENT DOCUMENTS

| | | |
|---|---|---|
| 2006/0103263 A1 | 5/2006 | Naito et al. |
| 2006/0113856 A1* | 6/2006 | Tanno .................... H02K 21/24 310/156.37 |
| 2009/0230811 A1* | 9/2009 | Asano .................. F04C 23/008 310/216.001 |
| 2011/0084569 A1 | 4/2011 | Asano et al. |
| 2011/0156519 A1* | 6/2011 | Wang .................. H02K 1/2793 310/114 |

FOREIGN PATENT DOCUMENTS

| | | |
|---|---|---|
| JP | 6-327190 | 11/1994 |
| JP | 11-356016 | 12/1999 |
| JP | 2003-32923 | 1/2003 |
| JP | 2006-50745 | 2/2006 |
| JP | 2007-82300 | 3/2007 |
| JP | 2010-43558 | 2/2010 |
| JP | 2011-66978 | 3/2011 |

OTHER PUBLICATIONS

First Office Action dated May 11, 2020 in Chinese Patent Application No. 201780061166.6.
Extended European Search Report dated Apr. 21, 2020 in European Patent Application No. 17858331.6.
International Search Report dated Dec. 12, 2017 in corresponding International Application No. PCT/JP2017/035774.
Chinese Office Action dated Oct. 13, 2020, in corresponding Chinese Patent Application No. 201780061166.6.

* cited by examiner

AXIAL-GAP TYPE MOTOR

CROSS REFERENCE TO THE RELATED APPLICATION

This application is a continuation application, under 35 U.S.C. § 111(a), of international application No. PCT/JP2017/035774, filed Oct. 2, 2017, which is based on and claims Convention priority to Japanese patent application No. 2016-197030, filed Oct. 5, 2016, the entire disclosure of which is herein incorporated by reference as a part of this application.

BACKGROUND OF THE INVENTION

Field of the Invention

The present invention relates to an axial-gap type motor used for various devices.

Description of Related Art

The following proposals have been made for electric motors. Patent Document 1 proposes an electric brake device using a motor and a linear motion mechanism. Patent Document 2 proposes an electric brake device in which an electric motor is disposed on a shaft that is parallel to, and different from, the rotational shaft of a linear motion mechanism.

RELATED DOCUMENT

Patent Document

[Patent Document 1] JP Laid-open Patent Publication No. H6-327190
[Patent Document 2] JP Laid-open Patent Publication No. H11-356016

In an electric brake device using an electric linear motion actuator such as the electric brake device described in Patent Document 1, it is generally desired to realize an electric actuator that saves space and is highly responsive as much as possible. As an electric motor having a structure capable of saving space and generating high torque, an axial-gap type motor such as one described in Patent Document 2 has been known, for example. However, as compared to a radial-gap type motor in which a magnetic circuit is formed on a plane, a magnetic circuit of an axial-gap type motor is three-dimensionally formed, and thus a core used for an excitation circuit of the axial-gap type motor is difficult to be manufactured, whereby a possibility may arise regarding manufacturing cost.

For example, when a core portion and a back yoke portion are separately manufactured and joined together through welding or the like, accurate positioning may become difficult especially in a case of a small-sized motor. In addition, in the case of a small-sized motor, the core portion may become difficult to manufacture owing to, for example, peeling of a stacked core during machining.

SUMMARY OF THE INVENTION

An object of the present invention is to provide an axial-gap type motor in which positioning among components composing a yoke-provided core is easy so that manufacturing thereof can be performed accurately and easily, and which exerts superiority in performance and cost.

An axial-gap type motor according to the present invention is an axial-gap type motor including a stator statically held by a housing, and a rotor supported so as to be rotatable relative to the stator, either one of the stator and the rotor including: a yoke-provided core including a back yoke of an annular shape concentric with a rotational shaft of the rotor, and a plurality of magnetic pole cores projecting in a direction of the rotational shaft of the rotor from a side surface of the back yoke so as to form magnetic poles which are parallel to the rotational shaft of the rotor; and coils wound around the respective magnetic pole cores, wherein the yoke-provided core is a core-pieces-arrayed body obtained by arraying, in a circumferential direction thereof, core pieces obtained through division for the respective magnetic pole cores, each core piece includes a magnetic pole core portion which is a part of the corresponding magnetic pole core, and a back yoke portion which is a part of the back yoke, and each core piece is a steel plate laminate obtained by stacking a plurality of steel plates in a radial direction of the rotational shaft.

In this configuration, the yoke-provided core has a divided structure. However, since the individual core pieces obtained through division each have a structure in which the magnetic pole core portion and the back yoke portion are integrated with each other, the magnetic permeability increases, so that an excitation magnetic flux per unit current increases and iron loss can be reduced at the time of rotation of the motor, whereby this structure becomes suitable for obtaining high output.

In addition, in a manufacturing process, the magnetic pole core portion and the back yoke portion need not to be joined through welding or the like, whereby no need arises in terms of accurate positioning unlike in a structure in which the cores and the back yoke are positioned relative to each other for assembling. Although the yoke-provided core is divided into the plurality of core pieces arrayed in the circumferential direction, since the core piece in which the magnetic pole core portion and the back yoke portion are integrated with each other can be positioned by, for example, fitting the core piece to the housing, accurate positioning can be easily performed. Although the yoke-provided core is composed of the steel plate laminates, since the yoke-provided core can be easily manufactured as described above, a possibility that the steel plate laminates are peeled during machining does not arise even in a case of a small-sized motor.

In the present invention, the division may be made at an intermediate location in a width, in a rotor circumferential direction, of each magnetic pole core, and, in each core piece, the magnetic pole core portion may include two magnetic pole core half portions which are respective parts of adjacent two of the magnetic pole cores, and the back yoke portion may extend between the two magnetic pole core half portions. In this configuration, each coil is wound around an outer periphery of a portion at which the magnetic pole core half portions of corresponding adjacent two of the core pieces are combined with each other. Accordingly, even though the adjacent two of the core pieces are not joined together through welding or the like, increase in magnetic path resistance, in other words, reduction in magnetic permeability, due to generation of a gap between the two core pieces, is prevented.

In this configuration, each core piece may be the steel plate laminate as a laminated body of steel plates having identical shapes. In the above-described structure, each magnetic pole core half portion of each core piece has an even width in the circumferential direction. Accordingly, each core piece can be easily manufactured by stacking steel plates having identical shapes.

In the configuration in which the two magnetic pole core half portions are provided, each core piece may be composed of two or more core piece division bodies arrayed in a rotor radial direction. These two core piece division bodies may be different from each other in a width in the rotor circumferential direction, and, of the two core piece division bodies, a core piece division body having a larger width may be located on an outer side in the rotor radial direction and a core piece division body having a smaller width may be located on an inner side in the rotor radial direction. Portions, of each core piece division body, which serve as the magnetic pole core half portions may each have an even width in the rotor circumferential direction. In this structure, it is possible to reduce a gap, inside the magnetic pole core, generated by stacking the steel plates having identical shapes, whereby influence, of the gap, on the magnetic permeability can be reduced. As a result, the torque of the axial-gap type motor can be increased.

In this configuration, column-shaped gap-filling core pieces may be each interposed between portions, which serve as the magnetic pole core half portions, on opposed sides of at least the corresponding core piece division bodies located on the outer side in the rotor radial direction. In the case where the portions, of each core piece division body, which serve as the magnetic pole core half portions, each have an even width in the rotor circumferential direction, as described above, although the manufacturing is easy, a gap is generated in the magnetic pole core. This gap causes reduction in the magnetic permeability, in other words, increase in magnetic resistance. However, by interposing the gap-filling core piece, the gap is eliminated or reduced, whereby reduction in the magnetic permeability is mitigated or overcome.

In this configuration, each gap-filling core piece may be made of a second steel plate laminate obtained by stacking, in a direction parallel to the rotational shaft of the rotor, steel plates having shapes identical to one another. If the gap-filling core piece made of the steel plate laminate is used, since the steel plates having identical shapes are stacked, manufacturing is easy and reduction in the magnetic permeability can be mitigated or overcome at the time of low-speed rotation of the axial-gap type motor.

In the axial-gap type motor according to the present invention, the division may be made at locations of portions that are each disposed between the corresponding adjacent magnetic pole cores and that constitute the back yoke, and each core piece may have a single magnetic pole core. In this configuration, since no joining gap between the core pieces is present in the magnetic pole core, there is an advantage that magnetic saturation is made unlikely to occur at the time of generation of high torque.

In the axial-gap type motor according to the present invention, the stator may have the yoke-provided core, and the housing in which the stator is disposed may have an annular fitting groove in which the back yoke of the yoke-provided core is fitted to be positioned. In this configuration, the back yoke is fitted to be positioned in the fitting groove of the housing, whereby each core piece is easily and accurately positioned and the axial-gap type motor is more easily manufactured.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
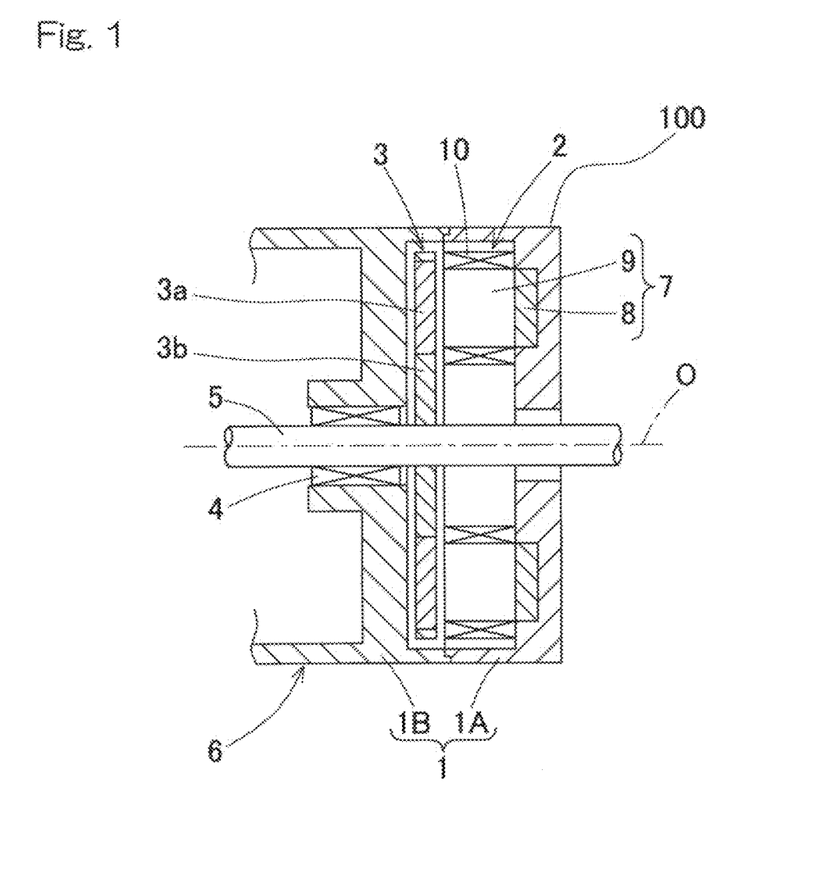
FIG. 1 is a longitudinal sectional view of an axial-gap type motor according to an embodiment of the present invention.

An embodiment of the present invention will be described with reference to FIG. 1 to FIG. 4. In FIG. 1, an axial-gap type motor 100 includes: a stator 2 statically held by a housing 1, that is, fixed so as to be incapable of relative movement thereto; and a rotor 3 supported so as to be rotatable relative to the stator 2. The rotor 3 is fixed to the outer periphery of a rotor shaft 5 rotatably supported by the housing 1 via a bearing 4. The housing 1 is composed of a plurality of division housings 1A and 1B, and the stator 2 is disposed in one of the housings, specifically, the division housing 1A. The other division housing 1B serves also as a housing for a motor-using device 6, and a part of the division housing 1B serves as a motor housing. The division housing 1A is attached to the division housing 1B by engagement, fitting, or the like, thereby obtaining the integrated housing 1. The motor-using device 6 is implemented by, for example, a rotary device such as a linear motion actuator.

This axial-gap type motor is a permanent magnet type synchronous motor, and the stator 2 is an excitation mechanism composed of an assembly component including a yoke-provided core 7 and coils 10. The rotor 3 is obtained by embedding, in a disc-like magnetic material 3b, a plurality of permanent magnets 3a arrayed in the circumferential direction. The rotor 3 may be entirely made from a magnetic material. In that case, a reluctance type synchronous motor can be obtained.

The assembly component which serves as the stator 2 is composed of the yoke-provided core 7 and the coils 10. The yoke-provided core 7 is composed of an annular back yoke 8 concentric with a rotor rotational axis O; and a plurality of magnetic pole cores 9 projecting from a side surface of the back yoke 8 in a direction of the rotor shaft 5 or a direction of the rotor rotational axis O (also, referred to as a rotational shaft direction) so as to form magnetic poles which are parallel to the rotor rotational axis O. The back yoke 8 has a shape of a flat plate perpendicular to the rotor rotational axis O, and forms a magnetic circuit which is substantially parallel to a rotation plane of the rotor shaft 5. The front shape of the back yoke 8 is, as described later, a polygonal annular shape so as to allow easy positioning relative to the division housing 1A. The coils 10 are conductors such as conducting wires wound around the respective magnetic pole cores 9, and each magnetic pole core 9 and the corresponding coil 10 wound around the magnetic pole core 9 compose a single individual excitation mechanism for converting, into an interlinkage magnetic flux, current flowing through the conducting wire.

Figure 4:
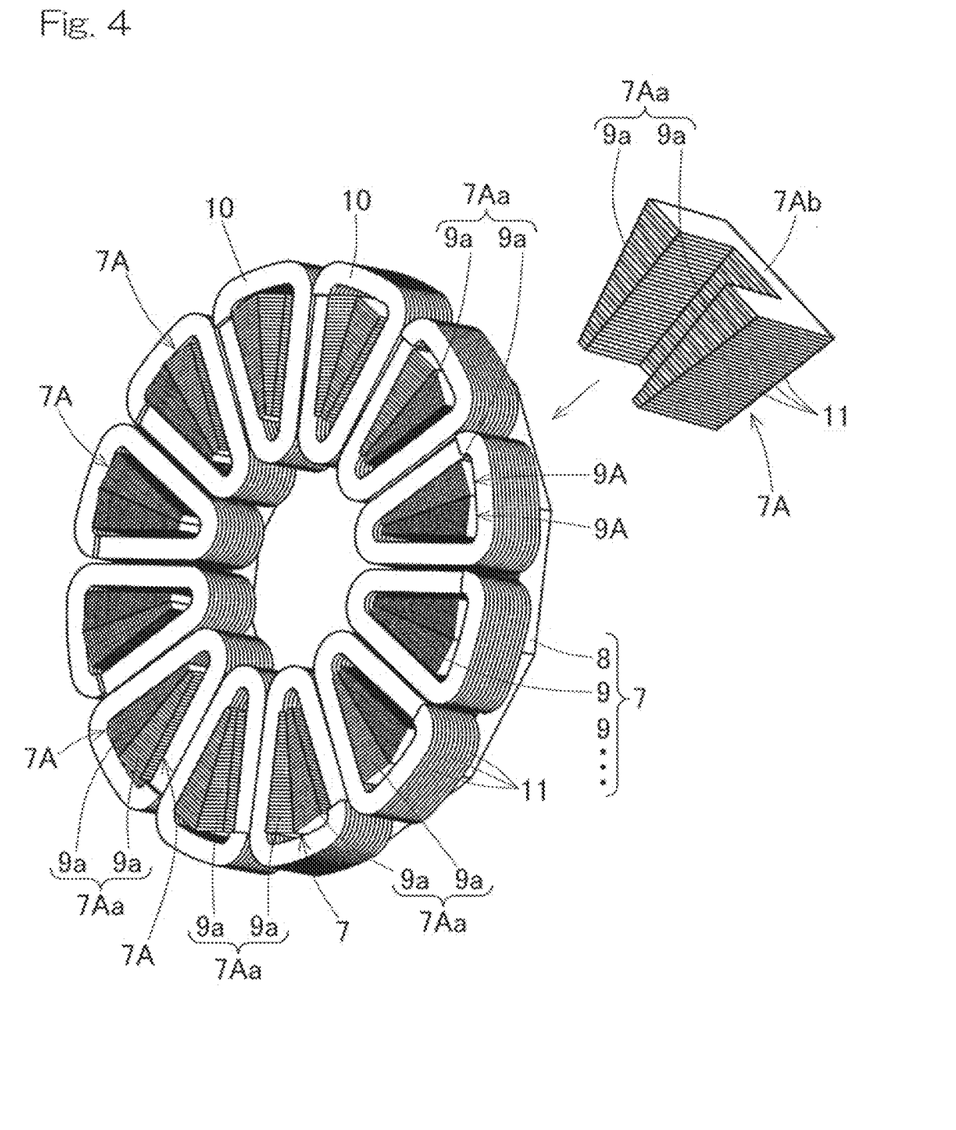
FIG. 4 is a perspective view showing an excitation mechanism composed of the yoke-provided core and the coils, and a core piece constituting a part of the excitation mechanism.

As shown in FIG. 4, the plurality of magnetic pole cores 9 are, specifically, arrayed so as to be equidistantly adjacent to each other in the circumferential direction for one round, for example. The front shape of each magnetic pole core 9 is a fan shape. The number of the magnetic pole cores 9 is an integral multiple of the number of phases of AC current to be applied. The shown example indicates a three-phase motor, and the number of the magnetic pole cores 9 is 12 which is four times the number of the phases, i.e., 3.

As the conducting wire of the coil 10, a coated conducting wire having a rectangular cross-sectional shape is used in the example in FIG. 4, and is wound, in a single layer, around the outer periphery of the magnetic pole core 9 via a coil bobbin (not shown) so as to be arrayed in the direction of projection of the magnetic pole core 9. The conducting wire may be wound in the single layer as this, or the conducting wire may be a coated conducting wire having a circular cross-sectional shape and wound around the coil bobbin (not shown) fitted on the outer periphery of the corresponding magnetic pole core 9, so as to be stacked in multiple layers. Alternatively, the conducting wire may be wound around the coil bobbin (not shown) fitted on the outer periphery of the corresponding magnetic pole core 9 as described above, or may be directly wound via an insulating paper sheet or the like and fixed by means of varnish, molding, or the like.

In the axial-gap type motor having the above-described basic configuration, in the present embodiment, the yoke-provided core 7 is a core-pieces-arrayed body obtained by arraying, in the circumferential direction, core pieces 7A obtained through division for the respective magnetic pole cores 9. That is, the number of the core pieces 7A is 12. Each core piece 7A includes a magnetic pole core portion 7Aa which corresponds to a part of the magnetic pole core 9, and a back yoke portion 7Ab which corresponds to a part of the back yoke 8. That is, the magnetic pole core 9 is formed by connecting the magnetic pole core portions 7Aa, and the back yoke 8 is formed by connecting the back yoke portions 7Ab. Each core piece 7A is a steel plate laminate obtained by stacking a plurality of steel plates 11 in the radial direction of the rotational shaft (rotor shaft) 5 (see FIG. 1).

Various manners of division can be employed for the core pieces 7A. In the present embodiment, the division of the yoke-provided core 7 into the plurality of core pieces 7A is made at an intermediate location in the width, in the rotor circumferential direction, of each magnetic pole core 9. In the shown example, the division is made at the center location in the width, in the rotor circumferential direction, of the magnetic pole core 9. Therefore, the magnetic pole core portion 7Aa of each core piece 7A includes two magnetic pole core half portions 9a which are apart from each other and which are parts of adjacent two of the magnetic pole cores 9. The back yoke portion 7Ab is present so as to extend between the two magnetic pole core half portions 9a and 9a. In each core piece 7A, the two magnetic pole core half portions 9a and 9a and the back yoke portion 7Ab form a shape of a groove when viewed in the radial direction of the rotational shaft 5. Adjacent two of the magnetic pole core half portions 9a and 9a of adjacent two of the core pieces 7A compose the magnetic pole core 9.

Each magnetic pole core half portion 9a of each core piece 7A has a width that decreases toward the radially inward direction of the rotational shaft 5. Therefore, the width dimensions (in the circumferential direction) of the stacked steel plates 11 are different from one another. The magnetic pole core half portion 9a having this shape may be produced by, for example: stacking the steel plates 11 which are gradually different from one another in the width dimensions of both magnetic pole core half portions 9a and the width dimension of the entirety (i.e., the width dimensions may be equal to one another); or stacking steel plates having identical shapes and then diagonally cutting the laminate plates obtained by the stacking.

Figure 2:
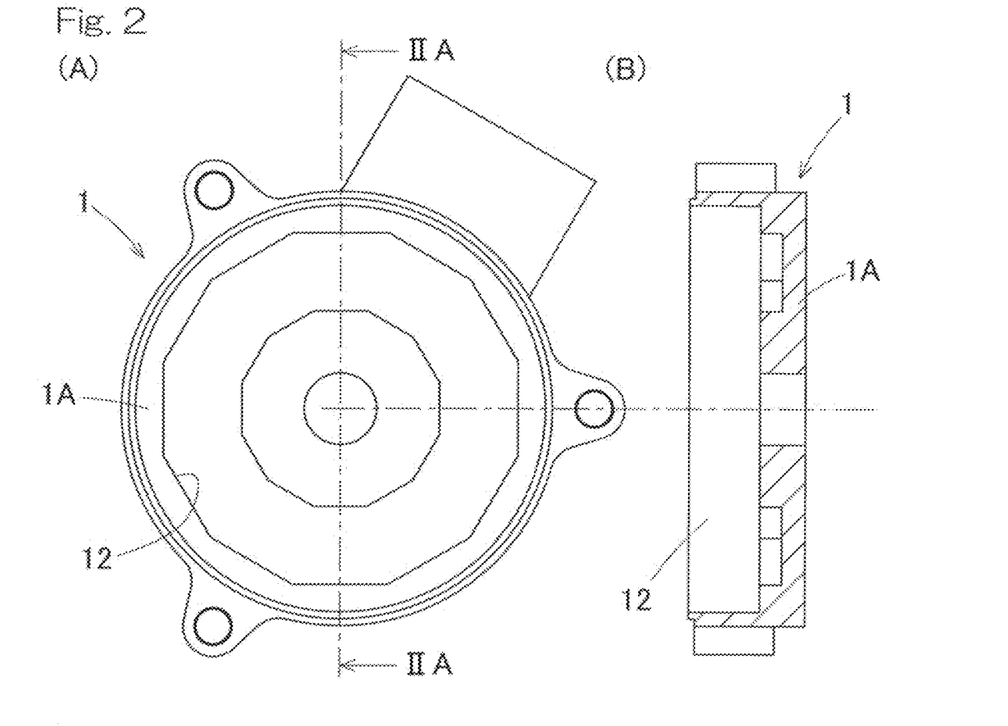
FIG. 2 shows a component serving as a housing of the axial-gap type motor, in which chart (A) is a front view, and chart (B) is a longitudinal sectional view taken along the line IIA-IIA in chart (A)
Figure 3:
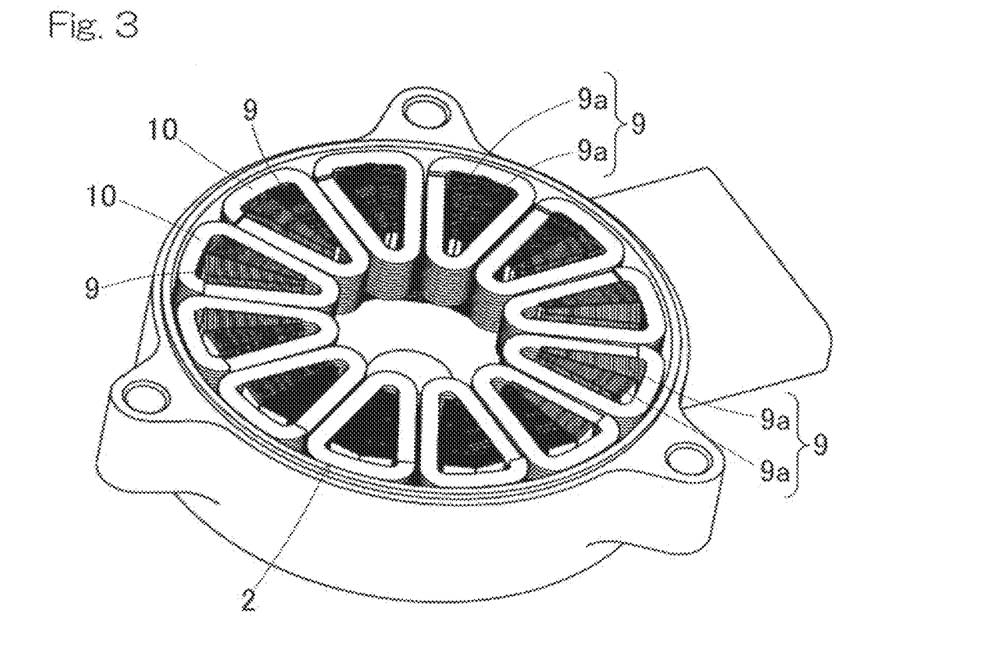
FIG. 3 is a perspective view showing a state where a stator composed of a yoke-provided core and coils is fitted in the component serving as the housing in FIG. 2.

Charts (A) and (B) of FIG. 2 show an example of the structure of the division housing 1A in which the excitation mechanism that is the assembly component composed of the yoke-provided core 7 and the coils 10 in FIG. 4 is to be disposed. For simple explanation, the division housing 1A is shown, with a wire, a support member such as a spacer and the like being omitted. Chart (A) of FIG. 2 shows the front view of the division housing 1A, and chart (B) of FIG. 2 shows a longitudinal sectional view taken along the line IIA-IIA in chart (A) of FIG. 2. Since a fitting groove 12 having a front shape (in the present embodiment, a polygonal shape) approximately identical to that of the back yoke 8 is formed in the bottom surface of the division housing 1A, the excitation mechanism can be easily positioned relative to the division housing 1A at the time of assembling. FIG. 3 shows an example in which the assembly component which serves as the excitation mechanism is assembled to the division housing 1A in charts (A) and (B) of FIG. 2. In the division housing 1A, the shape of the fitting groove 12 is not limited to the above-described approximately identical shape, but only has to be such a shape as to allow the positioning by means of partial contact with the yoke-provided core 7. For example, in chart (A) of FIG. 2, the outer peripheral side of the fitting groove 12 may have, instead of a polygonal shape, the shape of a circle with which the outermost portion of the yoke-provided core 7 comes into contact (i.e., a circumscribed circle shape), to perform the positioning.

The division housing 1A may be molded from a resin such as PBT or may be made from a metal material. In a case where a resin material is used, a bus bar for wiring, etc., may be insert-molded thereinto, for example. In a case where a metal material is used, the metal material may be a magnetic material such as iron, or a non-magnetic material such as aluminum or SUS. Alternatively, a structure in which the division housing 1A is formed from a resin material and a separately-provided metal case made from aluminum or the like is combined therewith, may be employed.

In the axial-gap type motor having the above-described configuration, the yoke-provided core 7 has a divided structure. However, since the individual core pieces 7A obtained through division each have a structure in which the magnetic pole core portion 7Aa which is a part of the magnetic pole core 9 and the back yoke portion 7Ab which is a part of the back yoke 8 are integrated with each other, the magnetic permeability increases, so that an excitation magnetic flux per unit current increases and iron loss can be reduced at the time of rotation of the motor, whereby this structure becomes suitable for obtaining high output. In addition, in a manufacturing process, the magnetic pole core portion 7Aa which is a part of the magnetic pole core 9 and the back yoke portion 7Ab which is a part of the back yoke 8 do not need to be joined through welding or the like, whereby no need arises in terms of accurate positioning unlike in a structure in which the magnetic pole core 9 and the back yoke 8 are positioned relative to each other for assembling. Although the yoke-provided core 7 is divided into the plurality of core pieces 7A arrayed in the circumferential direction, since the core piece 7A in which the magnetic pole core portion 7Aa and the back yoke portion 7Ab are integrated with each other can be positioned by, for example, fitting the core piece 7 to the housing 1 as described above, accurate positioning can be easily performed. Although the yoke-provided core 7 is composed of the steel plate laminates, since the yoke-provided core 7 can be easily manufactured as described above, a possibility that the steel plate laminates are peeled during machining does not arise even in a case of a small-sized motor.

In the configuration in which the division of the yoke-provided core 7 in the present embodiment is made at an intermediate location in the width, in the rotor circumferential direction, of each magnetic pole core 9 as described above, each coil 10 is wound around the outer periphery of the magnetic pole core 9 formed by combining the magnetic pole core half portions 9a and 9a of corresponding adjacent two of the core pieces 7A and 7A. Accordingly, even though the adjacent two of the core pieces 7A and 7A are not joined together through welding or the like, reduction in the magnetic permeability due to generation of a gap between the two core pieces 7A and 7A is prevented.

Figure 5:
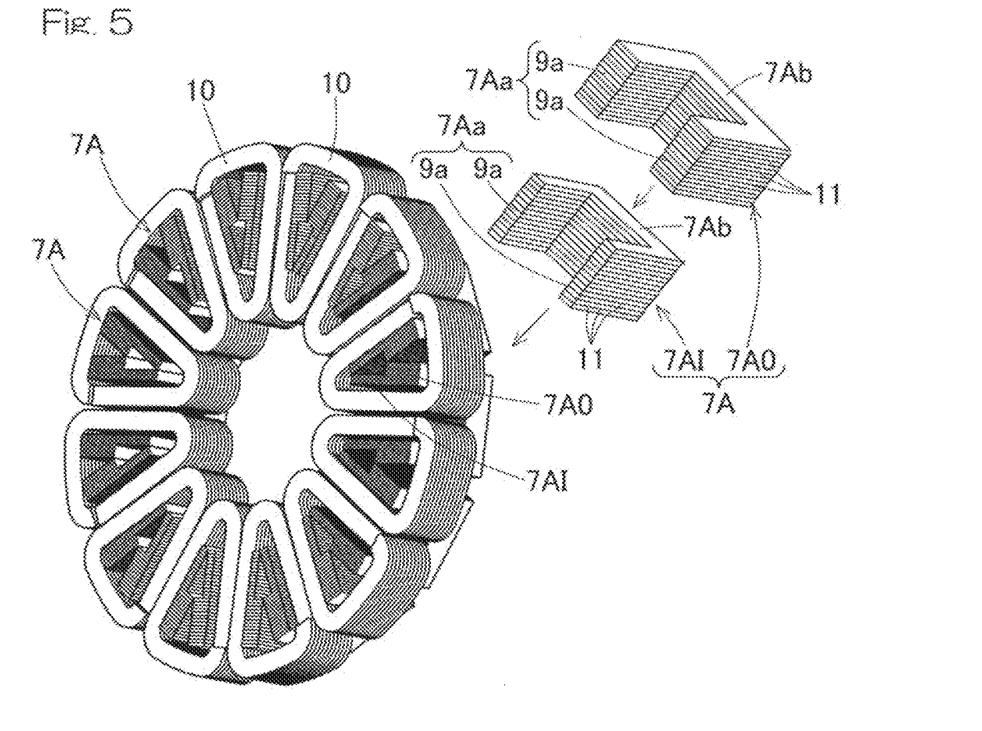
FIG. 5 is a perspective view showing an excitation mechanism composed of a yoke-provided core and the coils, and a core piece constituting a part of the excitation mechanism, in another embodiment.

FIG. 5 shows another embodiment of the present invention. The present embodiment is the same as the aforementioned embodiment described with reference to FIG. 1 to FIG. 4, except for matters described later in particular. The present embodiment is different from the aforementioned embodiment in that each core piece 7A is composed of two core piece division bodies 7AO and 7AI arrayed in the radial direction of the rotational shaft. These two core piece division bodies 7AO and 7AI are different from each other in the width in the rotor circumferential direction, and the core piece division body 7AO having a larger width is located on the outer side in the rotor radial direction and the core piece division body 7AI having a smaller width is located on the inner side in the rotor radial direction. The width dimension of the aforementioned groove is unchanged. In each of the core piece division bodies 7AO and 7AI, at respective portions which serve as the magnetic pole core half portions 9a, a width in the rotor circumferential direction is even. Here, the two core piece division bodies 7AO and 7AI are each obtained by stacking steel plates having identical shapes.

This configuration has a demerit that the occupation ratio of the magnetic pole core 9 is reduced on a plane orthogonal to the rotor rotational axis O, as compared to the aforementioned embodiment. On the other hand, since just the steel plates 11 having identical shapes have to be stacked, the yoke-provided core 7 can be manufactured by a low-cost manufacturing method. Although FIG. 5 shows an example in which the two types of core piece division bodies 7AO and 7AI having different sizes are disposed, the number of the types thereof may be increased so that the core occupation ratio is increased, or a core piece division body (not shown) having a single type of shape may be solely used to simplify the configuration.

Figure 6:
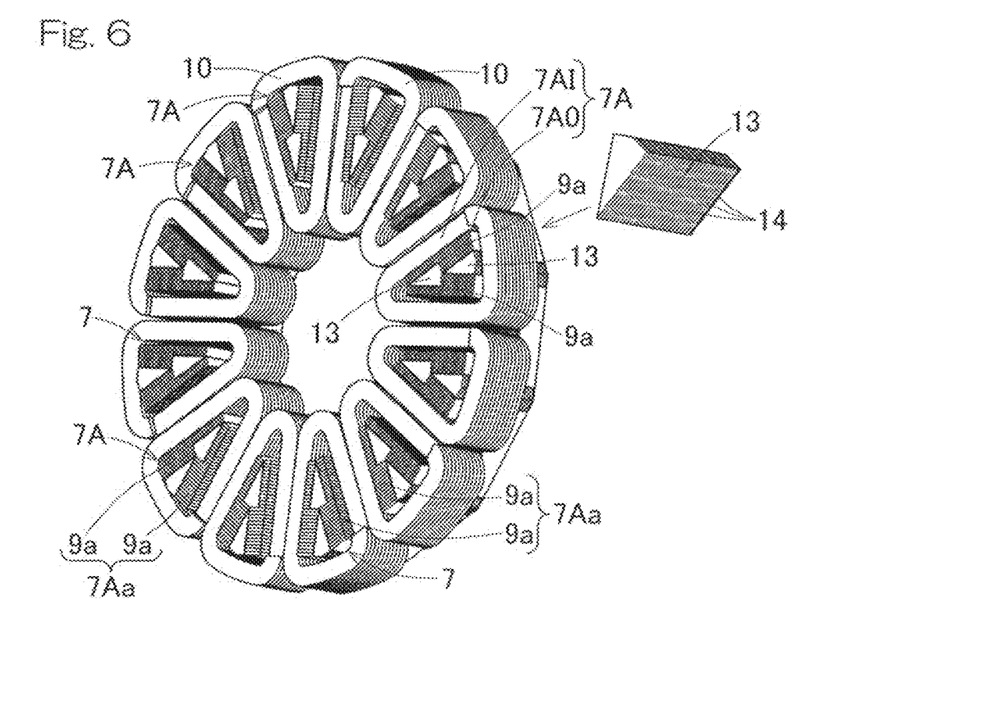
FIG. 6 is a perspective view showing a modification of the excitation mechanism composed of the yoke-provided core and the coils, and the core piece constituting a part of the excitation mechanism, in this embodiment.

FIG. 6 shows a modification in which column-shaped gap-filling core pieces 13 are each interposed between portions, which serve as the magnetic pole core half portions 9a and 9a, on the opposed sides of the corresponding core piece division bodies 7AO, 7AI in the embodiment in FIG. 5. That is, FIG. 6 shows an example in which the column-shaped gap-filling core pieces 13 (so-called iron core pieces) for filling spaces in the magnetic pole cores 9 are inserted, with respect to the example in which each magnetic pole core 9 is formed of the stacked steel plates having the identical shapes. In the present example, the gap-filling core pieces 13 are respectively inserted in the gaps formed both between the inner core piece division bodies 7AI and between the outer core piece division bodies 7AO.

The gap-filling core piece 13 may be obtained by stacking, in the rotor shaft direction, steel plates 14 having identical shapes, or may be made of a single magnetic material. Alternatively, the gap-filling core piece 13 may have a shape that allows the gap to be filled so as to eliminate spaces as much as possible as in FIG. 6, or may have a simple shape that does not allow the gap to be completely filled but is obtained by taking workability into account.

In the case where the portion which serves as the magnetic pole core half portion 9a of the core piece division body 7AO, 7AI has an even width in the rotor circumferential direction, as described above, although manufacturing is easy, a gap is generated in the magnetic pole core 9. This gap causes reduction in the magnetic permeability as described above. However, by interposing the gap-filling core piece 13, the gap is eliminated or reduced, whereby reduction in the magnetic permeability is mitigated or overcome. It is difficult that the column-shaped gap-filling core piece 13 has such a stacked structure as to have the same shape and be parallel to a stacking magnetic flux. Thus, as a motor angular velocity increases, the magnetic permeability is equivalently reduced owing to influence of eddy current. However, high torque output can be performed when the speed is zero to a low speed, that is, when influence of eddy current is unlikely to be inflicted.

Figure 7:
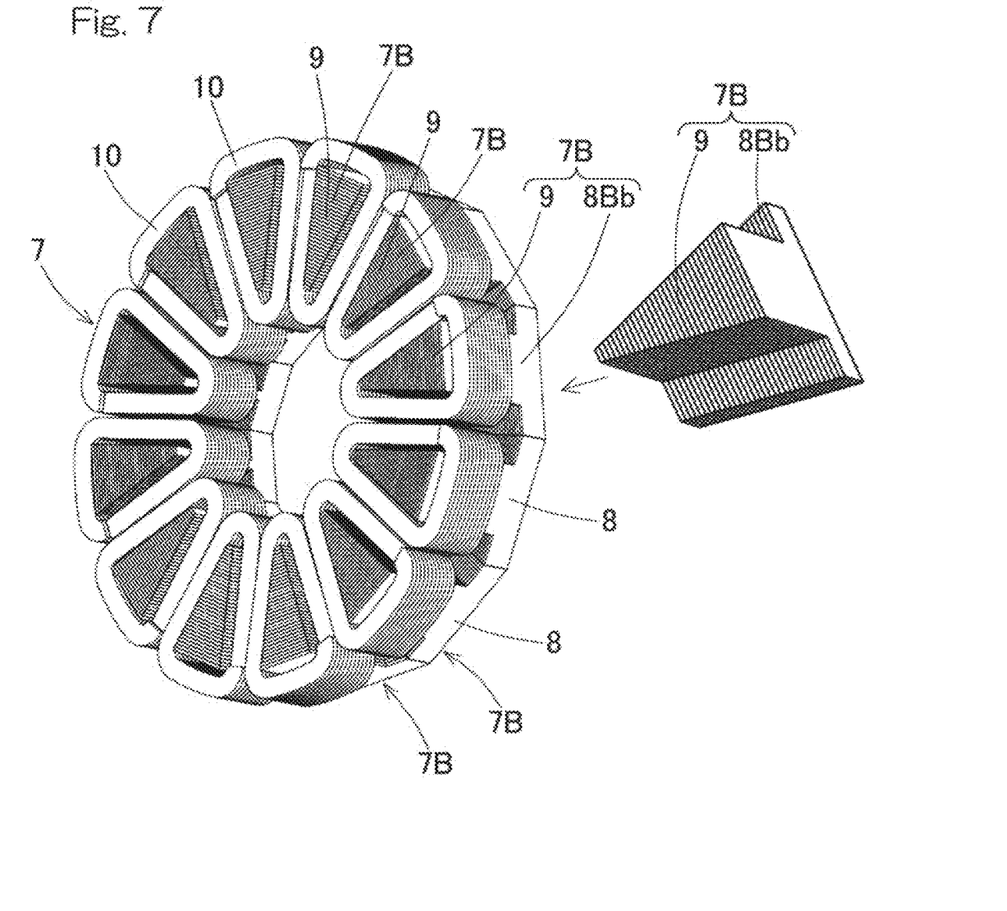
FIG. 7 is a perspective view showing an excitation mechanism composed of a yoke-provided core and the coils, and a core piece constituting a part of the excitation mechanism, in still another embodiment.

FIG. 7 shows a still another embodiment. In the present embodiment, although division into core pieces is made for the respective magnetic pole cores as described above, with respect to a core pieces 7B of this embodiment, the division of the yoke-provided core 7 is made at the locations of portions that are each disposed between the corresponding adjacent magnetic pole cores 9 and 9 and that constitute only the back yoke 8. That means each of these core pieces 7B has a single magnetic pole core 9. In other words, in the core piece 7B, the single magnetic pole core 9 and a back yoke portion 8Bb near the magnetic pole core 9 are integrated with each other.

This configuration has a merit that, since no joining gaps between the core pieces 7B and 7B are present in the magnetic pole cores 9, magnetic saturation is made unlikely to occur at the time of generation of high torque, as compared to the aforementioned embodiments. On the other hand, since joining gaps between the core pieces 7B and 7B are generated at the portions that constitute the back yoke 8, the excitation magnetic flux per unit current may be reduced in a linear region in which influence of magnetic saturation is small.

In each of the above-described embodiments, examples in which the stator 2 serves as the excitation mechanism composed of the yoke-provided core 7 and the coils 10, have been described. However, the present invention may be such that the rotor serves as the excitation mechanism composed of the yoke-provided core and the coils, similar to these examples. In this case, wiring between a power supply and the coils is performed via a slip ring (not shown), etc.

In addition, in each of the above-described embodiments, each of the stators 2 and the rotors 3 is single. However, the present invention is applicable also to an axial-gap type motor of a type in which the stators 2 are disposed on the opposed sides of the rotor 3, or an axial-gap type motor of a type in which the rotors 3 are disposed on the opposed sides of the stator 2.

Figure 8:
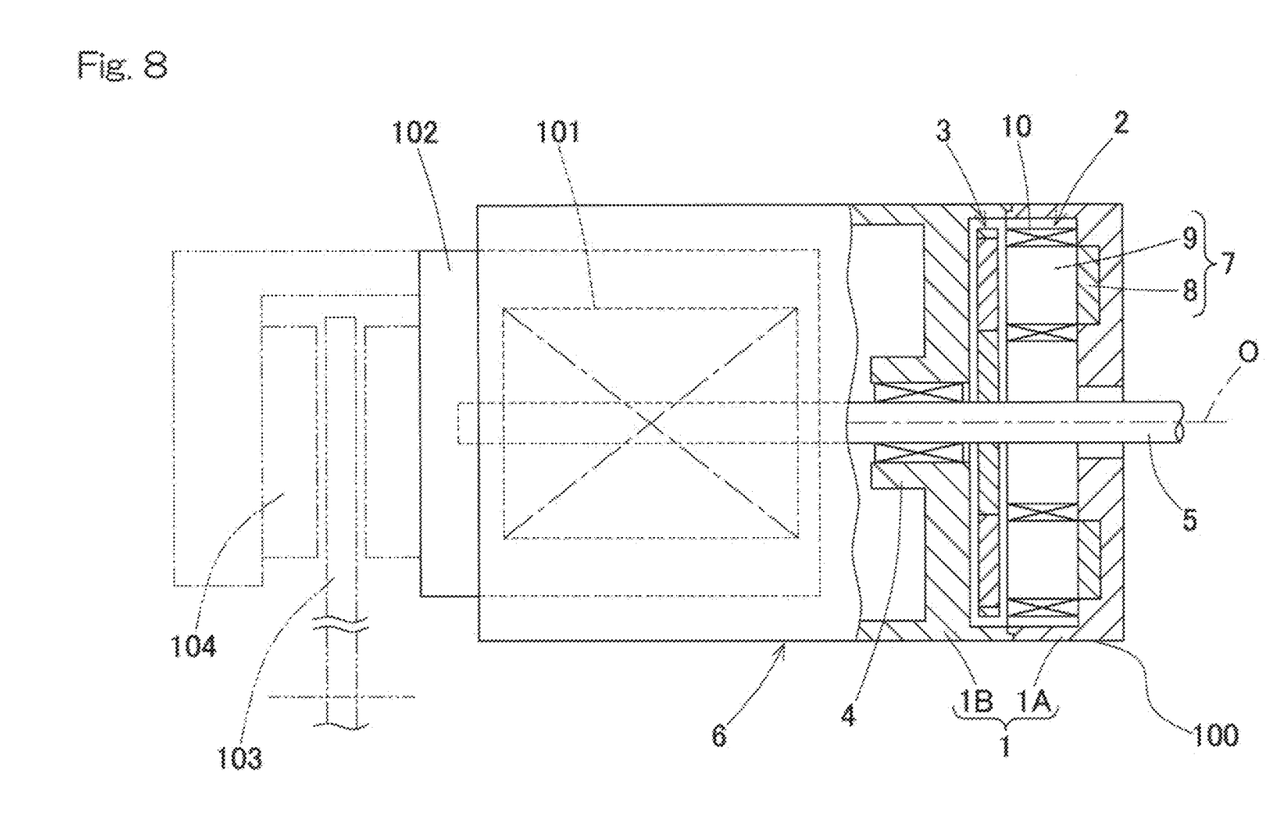
FIG. 8 is a longitudinal sectional view showing a linear motion actuator using the axial-gap type motor according to any one of the above-described embodiments.

FIG. 8 shows, in a simplified manner, an example in which an electric linear motion actuator is used as the motor-using device 6 employing the axial-gap type motor according to any one of the above-described embodiments. A linear motion mechanism 101 is disposed coaxially with the axial-gap type motor 100 shown in FIG. 1. The linear motion mechanism 101 is implemented by, for example, a ball screw mechanism rotationally driven by the rotor shaft 5 of the axial-gap type motor 100, and converts rotation of the axial-gap type motor 100 into linear motion of a linear motion portion 102 included in the linear motion mechanism 101. The motor-using device 6 which is an electric linear motion actuator is used for, for example, an electric brake device for braking a wheel of an automobile. The linear motion portion 102 is mounted with a friction pad 104 that is brought into contact with, or separated from, a brake rotor 103 rotating integrally with the wheel, and the linear motion portion 102 is used for driving the friction pad 104 such that the friction pad 104 advances or retreats.

Although the present invention has been fully described in connection with the preferred embodiments thereof with reference to the accompanying drawings, numerous additions, changes, or deletions can be made without departing from the gist of the present invention. Therefore, such additions, changes, and deletions are also construed as included within the scope of the present invention.

REFERENCE NUMERALS

1 . . . housing
1A, 1B . . . division housing
2 . . . stator
3 . . . rotor
5 . . . rotor shaft
7 . . . yoke-provided core
7A . . . core piece
7Aa . . . magnetic pole core portion
7Ab . . . back yoke portion
7B . . . core piece
8 . . . back yoke
9 . . . magnetic pole core
9a . . . magnetic pole core half portion
10 . . . coil
11 . . . steel plate
12 . . . fitting groove
14 . . . steel plate

What is claimed is:

1. An axial-gap type motor comprising
a stator statically held by a housing, and
a rotor supported so as to be rotatable relative to the stator,
either one of the stator and the rotor including:
a yoke-provided core including a back yoke of an annular shape concentric with a rotational shaft of the rotor, and a plurality of magnetic pole cores projecting in a direction of the rotational shaft of the rotor from a side surface of the back yoke so as to form magnetic poles which are parallel to the rotational shaft of the rotor; and
coils wound around the respective magnetic pole cores,
wherein
the yoke-provided core is a core-pieces-arrayed body obtained by arraying, in a circumferential direction thereof, core pieces obtained through division for the respective magnetic pole cores,
each core piece includes a magnetic pole core portion which is a part of the corresponding magnetic pole core, and a back yoke portion which is a part of the back yoke, and
each core piece is a steel plate laminate obtained by stacking a plurality of steel plates in a radial direction of the rotational shaft.

2. The axial-gap type motor as claimed in claim 1, wherein
the division is made at an intermediate location in a width, in a rotor circumferential direction, of each magnetic pole core, and,
in each core piece, the magnetic pole core portion includes two magnetic pole core half portions which are respective parts of adjacent two of the magnetic pole cores, and the back yoke portion extends between the two magnetic pole core half portions.

3. The axial-gap type motor as claimed in claim 2, wherein
each core piece is the steel plate laminate as a laminated body of steel plates having identical shapes.

4. The axial-gap type motor as claimed in claim 2, wherein
each core piece is composed of a plurality of core piece division bodies arrayed in a rotor radial direction,
the plurality of core piece division bodies are different from one another in a width in the rotor circumferential direction, and, among the core piece division bodies, a core piece division body having a larger width is located on an outer side in the rotor radial direction and a core piece division body having a smaller width is located on an inner side in the rotor radial direction, and
portions, of each core piece division body, which serve as the magnetic pole core half portions each have an even width in the rotor circumferential direction.

5. The axial-gap type motor as claimed in claim 4, wherein
column-shaped gap-filling core pieces are each interposed between portions, which serve as the magnetic pole core half portions, on opposed sides of the corresponding core piece division bodies.

6. The axial-gap type motor as claimed in claim 5, wherein
each gap-filling core piece is made of a second steel plate laminate obtained by stacking, in a direction parallel to the rotational shaft of the rotor, steel plates having shapes identical to one another.

7. The axial-gap type motor as claimed in claim 1, wherein the division is made at locations of portions that are each disposed between the corresponding adjacent magnetic pole cores and that constitute the back yoke, and each core piece has a single magnetic pole core.

8. The axial-gap type motor as claimed in claim 1 wherein the stator has the yoke-provided core, and the housing in which the stator is disposed has an annular fitting groove in which the back yoke of the yoke-provided core is fitted to be positioned.

\* \* \* \* \*